United States Patent [19]
Sien

[11] 3,926,276
[45] Dec. 16, 1975

[54] FIVE MAN MINE PERSONNEL CARRIER

[75] Inventor: Gerald Bruce Sien, Carlsbad, N. Mex.

[73] Assignee: Sien Equipment Company, Carlsbad, N. Mex.

[22] Filed: June 6, 1974

[21] Appl. No.: 476,917

[52] U.S. Cl. .............................. 180/89 R; 296/64
[51] Int. Cl.² ......................................... B62D 47/00
[58] Field of Search .......... 180/77 S, 77 MC, 89 R; 280/32.5, 32.7, 150 F, 150 R; 296/63, 64, 65 R; 172/431, 432, 433, 434; 293/69 R

[56] References Cited
UNITED STATES PATENTS

| | | | |
|---|---|---|---|
| 704,209 | 7/1902 | Putnam | 296/64 |
| 2,669,317 | 2/1954 | Celien | 180/89 R |
| 2,711,341 | 6/1955 | Mills | 180/89 R X |
| 2,870,820 | 1/1959 | Turnipseed | 280/150 R |
| 3,217,823 | 11/1965 | Balthes | 280/32.5 X |
| 3,415,399 | 12/1968 | Nunes | 172/431 X |

Primary Examiner—Leo Friaglia
Assistant Examiner—Terrance L. Siemens
Attorney, Agent, or Firm—Richards, Harris & Medlock

[57] ABSTRACT

A five man mine personnel carrier includes a frame which supports an engine and a transmission. The front end of the frame is supported by small diameter front steering wheels, and the rear end of the frame is supported by large diameter rear drive wheels which are operatively connected to the engine through the transmission. A pair of front fenders extend over the front wheels, a pair of rear fenders extend over the rear wheels, and a pair of normally horizontally disposed members extend between the rear ends of the front fenders and the front ends of the rear fenders. A seat is mounted over the transmission to define an operator's compartment, and a seat is provided on each rear fender for transporting personnel in the areas between the front and rear fenders. An additional rear facing two man seat is mounted between the rear fenders at the extreme rear end of the vehicle.

10 Claims, 3 Drawing Figures

FIVE MAN MINE PERSONNEL CARRIER

BACKGROUND AND SUMMARY OF THE INVENTION

This invention relates to a five man mine personnel carrier, and more particularly to a personnel carrier adapted to transport one person in an operator's compartment, two persons in areas situated between front and rear fenders, and two persons in a rear facing rear seat.

Heretofore a wide variety of devices have been designed for the specific purpose of transporting personnel in mines. For the most part these prior art mine personnel carriers have been designed to transport relatively large numbers of personnel such as the work crews which enter and leave the mine at shift changes. While functioning suitably for the intended purpose, such devices are not readily adapted to the transportation of a small number of persons through a mine, for example, supervisory personnel, visitors, mine inspectors, etc. Thus, a need exists for a personnel carrier which is particularly adapted for use in mines, which is rugged and reliable in operation, and which is adapted for the efficient transportation of a small number of persons through a mine.

The present invention comprises a five man mine personnel carrier which fulfills the foregoing and other requirements which have been found lacking in the prior art. In accordance with the broader aspects of the invention, a mine personnel carrier includes a frame, an engine and a transmission mounted on the frame, front steering wheels, rear drive wheels, and front and rear fenders. One person is transported in an operator's compartment, two persons are transported in areas extending between the front and rear fenders, and two persons are transported by means of a two man rear seat.

In accordance with more specific aspects of the invention, the operator's compartment includes a seat situated over the transmission and between the front portions of the rear fenders. The areas between the front and rear fenders include normally horizontally disposed members extending between the rear ends of the front fenders and the front ends of the rear fenders, seats mounted on the rear fenders, and guard rails. The rear fender mounted seats are pivotally supported to provide access to the operator's compartment. The rear seat comprises a rearwardly facing two man seat disposed between the rear portions of the rear fenders.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
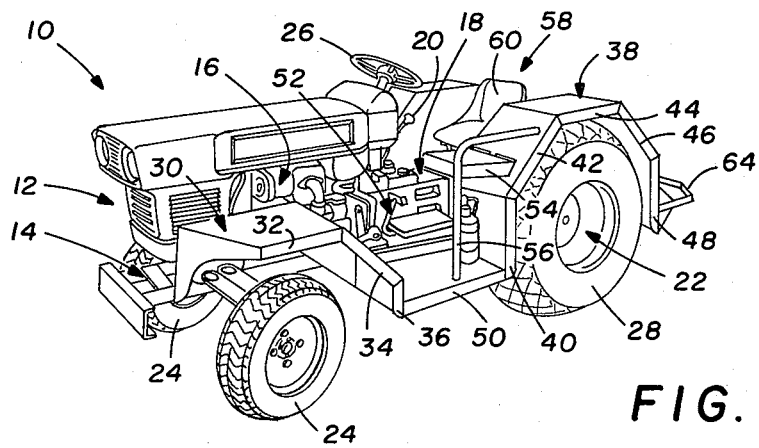
FIG. 1 is a perspective view of a five man mine personnel carrier incorporating the invention.

Referring now to the Drawings, and particularly to FIG. 1 thereof, there is shown a five man personnel carrier 10 incorporating the invention. The five man personnel carrier 10 includes a vehicle 12 having a frame 14 which extends substantially the entire length of the vehicle.

An engine 16 is mounted on the frame 14 of the vehicle 12, and functions to supply operating power for the various components of the five man personnel carrier 10. In order to facilitate use of the five man personnel carrier 10 in mines, the engine 16 preferably comprises a diesel engine. The engine 16 may comprise a vertically disposed, water-cooled, four cycle, two cylinder engine, having about 45.3 cubic inch displacement and developing a maximum output of about 17 horsepower at about 2800 RPM. Such a diesel engine may be of the type utilized in Kubota tractors, if desired.

A transmission 18 is supported on the frame of the vehicle 12 behind the engine 16 and is operatively connected to the output of the engine. The transmission 18 has a gear selection lever 20. The output of the transmission 18 is in turn operatively connected to a conventional differential 22 secured to the frame 14 behind the transmission. Both the transmission 18 and the differential 22 may be of the type utilized in Kubota tractors, if desired.

A pair of relatively small diameter front steering wheels 24 are situated on opposite sides of the vehicle 12 and serve to support the front ends of the frame 14. The vehicle 12 includes a conventional steering wheel 26 which is utilized to selectively pivot the steering wheels 24 relative to the frame 14 and thereby effect steering of the vehicle 12. A pair of relatively large diameter rear drive wheels 28 are situated on opposite sides of the vehicle 12 and serve to support the rear portion of the frame 14. The drive wheels 28 are operatively connected to the engine 16 through the differential 22 and the transmission 18 and serve to propel the vehicle 12.

A pair of front fenders 30 are secured to the frame 14 on opposite sides of the vehicle 12 and extend over the front steering wheels 24. Each front fender 30 has an upper normally horizontally disposed portion 32, a portion 34 extending angularly downwardly and rearwardly from the upper portion 32, and a lower normally substantially vertically disposed portion 36. A pair of rear fenders 38 are secured to the frame 14 on opposite sides of the vehicle 12 and extend over the rear drive wheels 28. Each rear fender 38 includes a forward normally substantially vertically disposed portion 40, a portion 42 extending angularly upwardly and rearwardly from the portion 40, an upper normally substantially horizontally disposed portion 44, a portion 46 extending angularly downwardly and rearwardly from the portion 44, and a rearward normally substantially vertically disposed portion 48.

A normally horizontally disposed member 50 is provided on each side of the vehicle 12 and extends between the bottom end of the normally vertically disposed portion 36 of the adjacent front fender 30 and the bottom end of the forward normally vertically disposed portion 40 of the corresponding rear fender 38. The normally horizontally disposed members 50 define a pair of personnel transport areas 52 situated on each side of the vehicle 12 between the front and rear fenders thereof. Each personnel transport area 52 further comprises a seat 54 mounted on the angularly upwardly and rearwardly extending portion 42 of the adjacent rear fender 38 and a guard rail 56 extending between the rear fender 38 and the normally horizontally disposed portion 50.

It will thus be understood that a person may be carried on the five man mine personnel carrier 10 in each personnel transport area 52 with such person riding on the seat 54 and protected by the guard rail 56. Such person may conveniently position his feet either on the normally horizontally disposed portion 50 or on the angularly downwardly and rearwardly extending portion 34 of the adjacent front fender 30.

The five man mine personnel carrier 10 further comprises an operator's compartment 58 including a seat 60 mounted over the transmission 18 and between the front portions of the rear fenders 38. The operator's compartment further includes the gear selection lever 20 of the transmission 18, the steering wheel 26, clutch pedals, brake pedals, and controls for regulating the various operating parameters of the engines 16.

Figure 2:
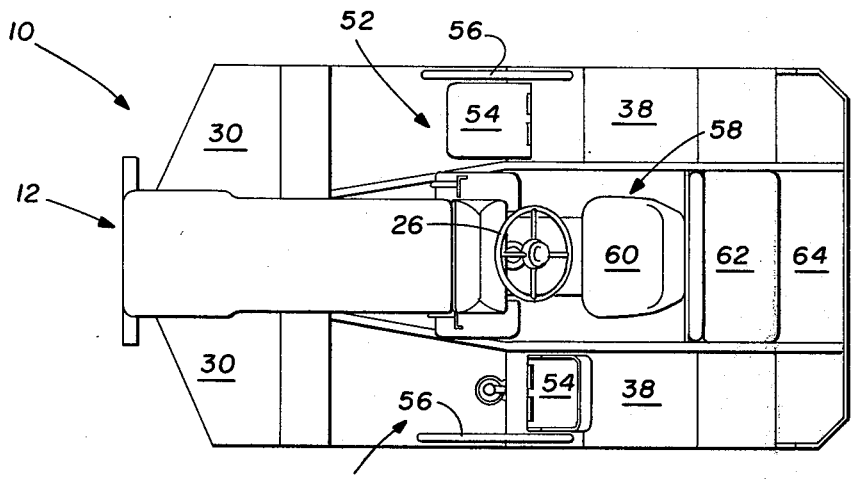
FIG. 2 is a top view.
Figure 3:
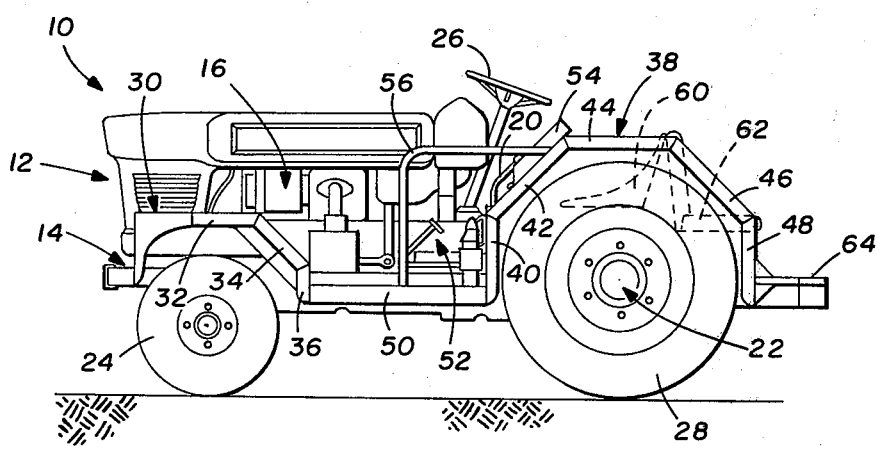
FIG. 3 is a side view.

Referring now to FIGS. 2 and 3, the five man personnel carrier 10 further includes a two man rear facing rear seat 62 situated at the extreme rear end of the vehicle 12 between the rear portions of the rear fenders 38. The two man rear seat 62 is provided with a footrest 64 projecting from the rear end of the frame 14. The footrest 64 further serves as a rear bumper for the five man mine personnel carrier 10.

The five man mine personnel carrier 10 is thus adapted to transport up to five persons through a mine. One person is transported in the operator's compartment 58 and serves as the operator for the five man mine personnel carrier 10. Two additional persons may be transported in the personnel transport areas 52 situated on either side of the vehicle 12. Such persons ride on the seats 54 and are protected by the guard rails 56. Finally, two persons may be transported on the rear facing rear seat 62 of the five man mine personnel carrier 10.

From the foregoing, it will be understood that the present invention comprises a mine personnel carrier incorporating numerous advantages over the prior art. Perhaps the most important advantage deriving from the use of the invention involves the fact that by means thereof there is provided an apparatus for efficiently transporting a relatively small number of persons through a mine. Another advantage to the use of the invention involves the fact that mine personnel carriers incorporating the invention are very rugged in construction, and are therefore adapted for long term trouble free service. Still another advantage deriving from the use of the invention involves the fact that mine personnel carriers constructed in accordance therewith are particularly adapted for use in mines.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A mine personnel carrier comprising:
a frame;
an engine mounted on the frame;
transmission means mounted on the frame behind the engine and operatively connected thereto;
a pair of front steering wheels mounted on opposite sides of the front end of the frame;
a pair of rear drive wheels mounted on opposite sides of the rear end of the frame and operatively connected to the engine through the transmission means to propel the vehicle;
a pair of front fenders mounted on the frame and each extending over one of the front steering wheels;
a pair of rear fenders mounted on the frame and extending over the rear wheels;
a pair of normally generally horizontally disposed members mounted on opposite sides of the frame and each extending between the rear end of one of the front fenders and the front end of the corresponding rear fender;
seat means mounted over the transmission means to define an operator's compartment including means for manipulating the front wheels to effect steering of the vehicle, means for regulating the operation of the engine, and means for regulating the operation of the transmission means; and
seat means mounted on the front portion of each rear fender whereby personnel may be transported on each side of the vehicle in the area extending over the horizontally disposed members between the front and rear fenders;
the areas extending between the seat means and the front fenders and over the horizontally disposed members being open to receive the legs of personnel sitting on the seat means and facing forwardly.

2. A mine personnel carrier comprising:
a frame;
an engine mounted on the frame;
transmission means mounted on the frame behind the engine and operatively connected thereto;
a pair of front steering wheels mounted on opposite sides of the front end of the frame;
a pair of rear drive wheels mounted on opposite sides of the rear end of the frame and operatively connected to the engine through the transmission means to propel the vehicle;
a pair of front fenders mounted on the frame and each extending over one of the front steering wheels;
a pair of rear fenders mounted on the frame and extending over the rear wheels;
a pair of normally generally horizontally disposed members mounted on opposite sides of the frame and each extending between the rear end of one of the front fenders and the front end of the corresponding rear fender;
seat means mounted over the transmission means to define an operator's compartment including means for manipulating the front wheels to effect steering of the vehicle, means for regulating the operation of the engine, and means for regulating the operation of the transmission means; and
seat means mounted on the front portion of each rear fender whereby personnel may be transported on each side of the vehicle in the area extending over the horizontally disposed members between the front and rear fenders;
at least one of the rear fender mounted seats being pivotally supported to provide access to the operator's compartment.

3. The mine personnel carrier according to claim 2 wherein each rear fender comprises a portion extending generally vertically upwardly from the horizontally disposed member, a portion extending angularly upwardly and rearwardly from the vertically extending portion, and a generally horizontally disposed portion extending rearwardly from the angularly extending portion, and wherein the seats are pivotally supported on the angularly extending portion of the rear fenders.

4. The mine personnel carrier according to claim 3 further including a rear facing seat situated between the rear fenders at the extreme rear end of the vehicle for transporting additional personnel through a mine.

5. In a mine personnel carrier of the type including a frame, an engine and a transmission mounted on the frame, front steering wheels, rear drive wheels, front fenders secured to the frame and extending over the front steering wheels, and rear fenders secured to the frame and extending over the rear drive wheels, the improvement comprising:
- a pair of normally horizontally disposed members each extending from the rear end of one of the front fenders to the front end of the corresponding rear fender to define personnel transport areas on each side of the frame;
- a seat mounted on the front portion of each rear fender to provide personnel seating in each of said personnel transport areas;
- the areas extending between the seats and the front fenders and over the horizontally disposed members being open to receive the legs of personnel sitting on the seats and facing forwardly; and
- a guard rail extending between each rear fender and the corresponding normally generally horizontally disposed member for protecting personnel within the adjacent personnel transport area.

6. In a mine personnel carrier of the type including a frame, an engine and a transmission mounted on the frame, front steering wheels, rear drive wheels, front fenders secured to the frame, and extending over the front steering wheels, and rear fenders secured to the frame and extending over the rear drive wheels, the improvement comprising:
- a pair of normally horizontally disposed members each extending from the rear end of one of the front fenders to the front end of the corresponding rear fender to define personnel transport areas on each side of the frame;
- a seat mounted on the front portion of each rear fender to provide personnel seating in each of said personnel transport areas;
- a guard rail extending between each rear fender and the corresponding normally generally horizontally disposed member for protecting personnel within the adjacent personnel transport area;
- an operator's compartment including a seat situated over the transmission between the front portions of the rear fender; and
- the seats mounted on the rear fenders being pivotally supported to provide access to the operator's compartment.

7. The improvement according to claim 6 further including a rearwardly facing two man seat situated between the rear portions of the rear fenders.

8. A five man mine personnel carrier comprising:
- a vehicle including a frame, an engine mounted forwardly on the frame, a transmission mounted on the frame behind the engine, rear drive wheels operatively connected to the engine through the transmission, and front steering wheels;
- front fenders secured to the opposite sides of the frame over the front steering wheels;
- rear fenders secured to the opposite sides of the frame over the rear drive wheels;
- normally generally horizontally disposed members secured to the opposite sides of the frame and each extending between the rear end of one of the front fenders and the front end of the corresponding rear fender;
- seat means mounted on the transmission to define an operator's compartment;
- seat means mounted on the front portion of each rear fender to define personnel transport areas on each side of the vehicle situated generally between the front and rear fenders; and
- a rear facing two man rear seat situated between the rear portions of the rear fenders;
- the areas extending between the seat means and the front fenders and over the horizontally disposed members being open to receive the legs of personnel sitting on the seat means and facing forwardly.

9. A five man mine personnel carrier comprising:
- a vehicle including a frame, an engine mounted forwardly on the frame, a transmission mounted on the frame behind the engine, rear drive wheels operatively connected to the engine through the transmission, and front steering wheels;
- front fenders secured to the opposite sides of the frame over the front steering wheels;
- rear fenders secured to the opposite sides of the frame over the rear drive wheels;
- normally generally horizontally disposed members secured to the opposite sides of the frame and each extending between the rear end of one of the front fenders and the front end of the corresponding rear fender;
- seat means mounted on the transmission to define an operator's compartment; and
- seat means mounted on the front portion of each rear fender to define personnel transport areas on each side of the vehicle situated generally between the front and rear fenders;
- the seats mounted on the rear fenders being pivotally supported to provide access to the operator's compartment.

10. The five man mine personnel carrier according to claim 9 further including a guard rail secured between each rear fender and the adjacent normally horizontally disposed member to protect persons riding on the fender mounted seats.

* * * * *